(No Model.) 2 Sheets—Sheet 1.

D. WHITING.
CLOVER HULLER.

No. 428,260. Patented May 20, 1890.

Witnesses:

Inventor:
David Whiting
By Thomas E. Barrow
Attorney.

(No Model.)
2 Sheets—Sheet 2.

D. WHITING.
CLOVER HULLER.

No. 428,260.  Patented May 20, 1890.

Witnesses:

Inventor:
David Whiting
By Thomas E. Barrow
Attorney.

UNITED STATES PATENT OFFICE.

DAVID WHITING, OF ASHLAND, OHIO.

CLOVER-HULLER.

SPECIFICATION forming part of Letters Patent No. 428,260, dated May 20, 1890.

Application filed December 18, 1889. Serial No. 334,190. (No model.)

*To all whom it may concern:*

Be it known that I, DAVID WHITING, a citizen of the United States, residing at Ashland, in the county of Ashland and State of Ohio, have invented certain new and useful Improvements in Clover-Hullers; and I do declare the following to be a full, clear, and exact description of the invention, such as will enable others skilled in the art to which it appertains to make and use the same.

My invention relates to the class of machines known as "clover-hullers," and has for its object the improvement of the machine covered by Letters Patent No. 316,210, granted to me April 21, 1885, as will be hereinafter clearly pointed out.

Figure 1:
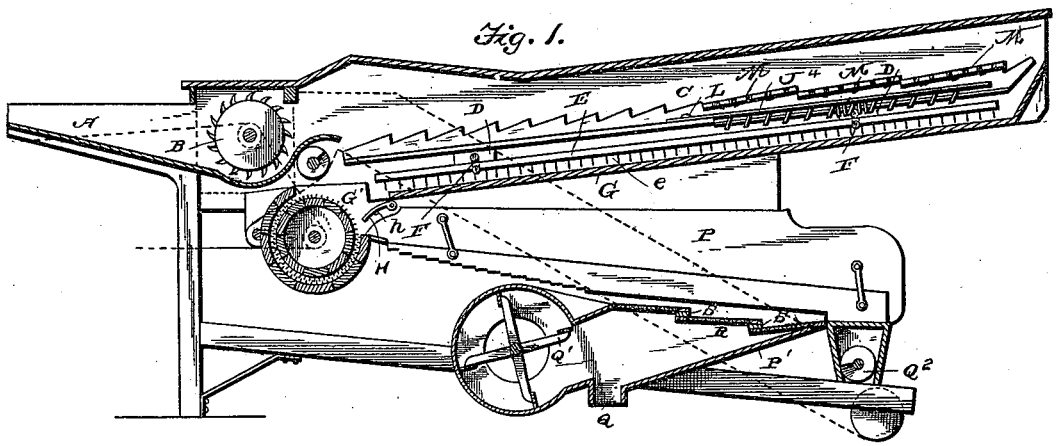
Figure 2:
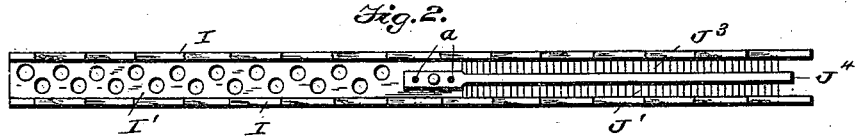
Figure 3:
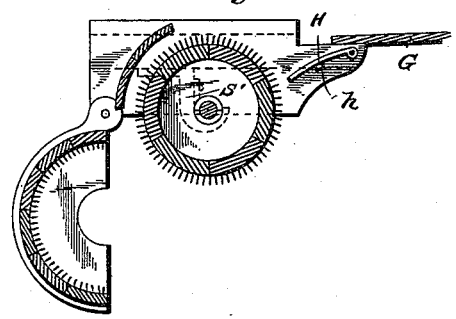
Figure 5:
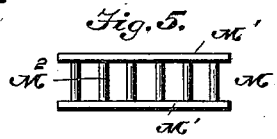
Figure 6:
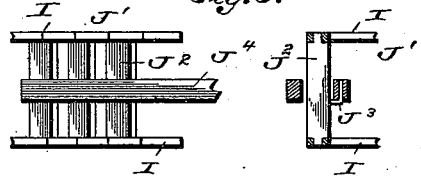
Figure 4:
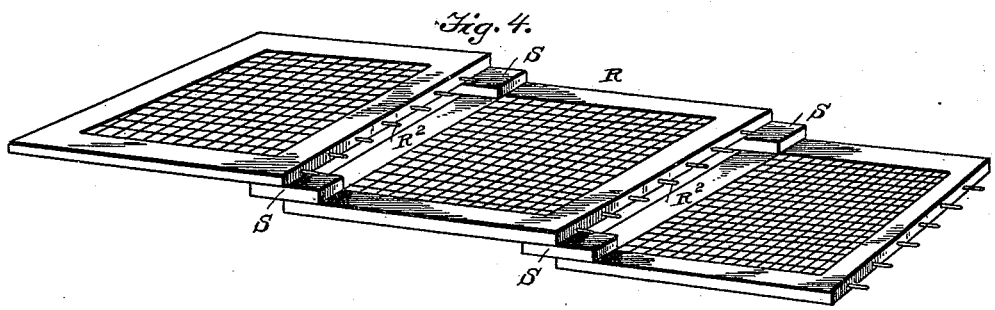

In the accompanying drawings, Figure 1 is a central longitudinal section of a clover-huller containing my improvements. Fig. 3 is a detail sectional view of the hulling-cylinder. Fig. 2 is a plan view of one section of the separating-frame. Fig. 4 is a perspective view of the sectional screen. Fig. 5 is a top view of a section of one of the frames resting upon the top of the separating-frame. Fig. 6 is a detail view of a portion of one of the separating-frames, showing a top plan and transverse section, respectively, of the adjustable slats and the rod for adjusting the same.

A represents the feed-trough in the front end of the frame, near the lower end of which is mounted the thrashing-cylinder B, of usual construction. In rear of the thrashing-cylinder is mounted the separating-frame C, inclining upward toward the discharge end, and consisting of several longitudinal sections (one of which is shown detached in Fig. 2) supported upon blocks D, carried by cranked rods F, extending transversely through the machine, and by which motion is given to the separating-frame in a well-known manner.

E denotes bars mounted below the sections of the separating-frame upon the blocks D, and carrying downward-projecting teeth or pins $e$, which move in a quite close proximity to the inclined board G, leading to the hulling-cylinder G'. The parts thus described are substantially similar to those shown and described in my aforesaid patent.

H is a pivoted plate mounted between the side walls of the concave at the lower end of the board G between it and hulling-cylinder G'. It serves to properly conduct the heads and seed to the hulling-cylinder, being supported in position by small stops $h$, secured to the inner walls of the concave. The object in hinging the plate H is to permit it to be swung up out of the way when it is desired to remove the cylinder.

The shaft of hulling-cylinder G is supported in open hangers S', which are secured to beams of the machine, and the hangers have curved bearings to receive the ends of the shaft. To remove the hulling-cylinder, it is merely necessary to swing the feed-board H up out of the way, remove the shaft from the hangers, drop the casing, as shown in Fig. 3, and the cylinder will have free space to allow its removal.

The shaking separating frame or table consists of several longitudinal separating and straw-conveying sections arranged parallel to each other and mounted alternately upon opposite cranks of the shaft F. Each section consists of side pieces I I, the upper edges of which are notched, as best seen in Fig. 1. The bottom of each section consists of two portions I' J', the part I' being nearest the cylinder B and perforated to permit the passage of the heads and portions easily separated from the mass of straw to the table or board G. The rear portion consists of a series of pivoted slats $J^2$, connected by L-shaped wires $J^3$ with a rod $J^4$. These wires or staples $J^3$ extend alternately from the opposite sides of the rod $J^4$. The inner or forward end of rod $J^4$ is flattened and provided with a series of holes $a$, through which passes a bolt L, uniting the rod with the bottom plate I' of the frame. It will be seen that by removing the bolt L and changing it from one to another of the holes $a$ the inclination of slats $J^2$ will be varied, and hence the size of the opening in the rear part of the shaking-frame regulated.

In order to assist in separating the heads and seed from the straw, I employ a series (three being shown, though I do not limit myself to that number) of frames M, mounted over the shaking-frame. Each frame M consists of side pieces M' and cross bars or slats $M^2$, which latter engage the notches on the upper edges of the shaking frame sections, and are thereby locked thereto and have imparted to them a motion common to that of the main separating-frame. In rear of the hulling-cylinder G' is the shaking separating-screen P, below which is an inclined board P', leading to the delivery-spout Q and forming part of a chute or throat for the blast from fan Q'. Below the delivery end of the screen P is a worm or other conveyer Q² for moving the tailings into a return-elevator. (Not shown.)

R indicates a sectional screen interposed between the shaking-screen P and inclined board P'. The sections of the screens are united at their edges by spacing-blocks S, whereby such section forms a step, as seen in Figs. 1 and 4. The arrangement of these sections is such that there are openings between their adjacent ends, so as to permit the air to pass freely between them, and thus prevent lodgment of grain or chaff. The rear end of each section is provided with a series of short wires R², projecting over the next lower section a short distance. They prevent the straw from passing through the openings with the cleaned grain or seed.

Having thus described my invention, what I claim as new, and desire to secure by Letters Patent, is—

1. In combination with the main separating-frame of a grain or seed separating machine having the upper edges of its sides notched, the supplemental removable frame M, consisting of side pieces M' and cross-slats M², the latter resting in the notches of the main frame, whereby the supplemental frame is supported thereon and moved therewith, substantially as set forth.

2. The combination, in a grain separating and hulling machine, of the double-cranked shaft F, a series of independent conveying and separating sections mounted on the cranks of said shafts, each section consisting of the notched side pieces I, having the separating-frame M, and a bottom, the rear part of which is formed by the transverse adjustable slats J, and the forward part of which is formed by the perforated plate I', substantially as set forth.

3. In a clover-huller, the combination of the seed-board, the pivoted concave, the pivoted plate, the stops for said plate, the cylinder, and the open hangers for the shaft of the cylinder.

In testimony whereof I affix my signature in the presence of two witnesses.

DAVID WHITING.

Witnesses:
CLOYD MANSFIELD,
R. A. WINBIGLER.